United States Patent
Garg et al.

(10) Patent No.: US 10,817,618 B2
(45) Date of Patent: Oct. 27, 2020

(54) RECOMMENDATION SYSTEM BASED ON INDIVIDUALIZED PRIVACY SETTINGS

(71) Applicant: Adobe Inc., San Jose, CA (US)

(72) Inventors: Ankur Garg, Chandigarh (IN); Kritin Kesav Sai Sathi, Visakhapatnam (IN); Kirnesh Nandan, Patna (IN); Iftikhar Ahamath Burhanuddin, Bangalore (IN); Aditya Prakash, Sonebhadra (IN)

(73) Assignee: Adobe Inc., San Jose, CA (US)

( * ) Notice: Subject to any disclaimer, the term of this patent is extended or adjusted under 35 U.S.C. 154(b) by 265 days.

(21) Appl. No.: 16/041,182

(22) Filed: Jul. 20, 2018

(65) Prior Publication Data
US 2020/0026876 A1 Jan. 23, 2020

(51) Int. Cl.
*H04L 29/06* (2006.01)
*G06F 21/62* (2013.01)
*G06F 21/60* (2013.01)
*G06F 16/9535* (2019.01)

(52) U.S. Cl.
CPC ...... *G06F 21/6245* (2013.01); *G06F 16/9535* (2019.01); *G06F 21/604* (2013.01)

(58) Field of Classification Search
CPC .... G06F 21/6245; G06F 21/604; G06F 21/62; G06F 21/10; G06F 16/9535
See application file for complete search history.

(56) References Cited

U.S. PATENT DOCUMENTS

| 8,301,659 | B2 * | 10/2012 | Lehikoinen | G06F 21/6218 707/724 |
| 8,755,794 | B2 * | 6/2014 | Keating | H04W 12/02 455/432.3 |
| 8,826,446 | B1 * | 9/2014 | Liu | G06F 21/6245 726/1 |

(Continued)

OTHER PUBLICATIONS

"HetRec 2011 | GroupLens", Retrieved at: https://grouplens.org/datasets/hetrec-2011/—on Apr. 30, 2018, 2 pages.

(Continued)

*Primary Examiner* — Hosuk Song
(74) *Attorney, Agent, or Firm* — SBMC (57) ABSTRACT

In implementations of a recommendation system based on individualized privacy settings, a computing device maintains user profiles of information and recommendations associated with users of the recommendation system. The computing device includes a recommendation module that is implemented to receive a privacy level selection for a type of items corresponding to a user profile in the system. The recommendation module can determine a privacy setting for a user associated with the user profile, where the privacy setting is individualized for the user in context of the type of items with an algorithmic noise function utilized to obfuscate a proportional level of the information associated with the user and the type of items based on the received privacy level selection. The recommendation module can also generate recommendations of relevant items for the user based on the determined privacy setting as individualized for the user in context of the type of items.

20 Claims, 4 Drawing Sheets

(56) References Cited

U.S. PATENT DOCUMENTS

| | | | | |
|---|---|---|---|---|
| 8,972,400 | B1* | 3/2015 | Kapczynski | G06Q 10/06 707/732 |
| 9,070,109 | B2* | 6/2015 | Sherman | H04L 51/00 |
| 2017/0032143 | A1* | 2/2017 | Kong | G06F 21/6245 |
| 2019/0147188 | A1* | 5/2019 | Benaloh | G06F 21/6245 726/26 |

OTHER PUBLICATIONS

Dwork,"Differential Privacy", Microsoft Research, Available at <http://research.microsoft.com/en-us/projects/databaseprivacy/dwork.pdf>, Jul. 1, 2006, 12 pages.

Kandappu,"PrivacyCanary: Privacy-Aware Recommenders with Adaptive Input Obfuscation", In Modelling, Analysis & Simulation of Computer and Telecom-munication Systems (MASCOTS), Feb. 2015, 10 pages.

Koren,"Matrix factorization techniques for recommender systems", In IEEE journal of Computer vol. 42, issue 8, Aug. 2009, pp. 42-49.

* cited by examiner

RECOMMENDATION SYSTEM BASED ON INDIVIDUALIZED PRIVACY SETTINGS

BACKGROUND

Various sales and data mining companies collect and process an increasing volume of data about individuals for the sake of personalization and advertisement targeting. Conversely, computer users often express the need to keep sensitive user information private, and mandate that companies cater to the privacy concerns of consumers by keeping user data private and complying with privacy regulations. Although many companies take measures to keep user data private, it is still possible to infer attributes about a specific individual, as well as potentially sensitive information, such as the political preferences or health condition of a particular person, through inference attacks on information and data associated with the particular person. Generally, some auxiliary information about a person can be obtained and then used to infer the potentially sensitive information. In particular, a person may provide the auxiliary information in the form of on-line product and service reviews. In addition, the auxiliary information may be obtained from recommendations for products, services, social connections, and the like that are provided by recommending services to computer users and consumers. There are also privacy concerns associated with publicly available user data, such as anonymized user activity data, recommendations based on collaborative systems, etc.

Differential privacy is a relatively newer technique that provides mechanisms by which differentially private algorithms cannot be used to make inferences about an individual from association information and user data, even in the presence of auxiliary information. In context, a differentially private recommendation system can prevent leakage of sensitive information while still providing relevant recommendations to users, such as for recommending media content like videos and movies, recommendations based on social media connections, and recommendations based on collaborative filtering of multiple users' information. However, conventional differential privacy techniques only allow for a single level of privacy, which impacts the performance of the overall system for all users. This is problematic if different users want different levels of privacy for their respective individual data and associated information. Given that the conventional differential privacy techniques can only accommodate a single level of privacy, the highest level of privacy is used, which then introduces a large amount of noise and degrades the performance of the recommendation system for all users, particularly for those who may only want a low level of privacy.

SUMMARY

This Summary introduces features and concepts of a recommendation system based on individualized privacy settings, which is further described below in the Detailed Description and shown in the Figures. This Summary should not be considered to describe essential features of the claimed subject matter, nor used to determine or limit the scope of the claimed subject matter.

Aspects of a recommendation system based on individualized privacy settings are described. In implementations, a computing device, such as a server computing device implemented in a cloud-based recommendation service system, maintains user profiles of information and recommendations associated with users of the recommendation system. The computing device includes a recommendation module that is implemented to receive a privacy level selection for a type of items corresponding to a user profile in the system. For example, the type of items associated with a user of the user profile may be movies, videos, or other multimedia, as well as any type of products and/or services, and the user can initiate the privacy level selection. The recommendation module can also determine a privacy setting for the user associated with the user profile, where the privacy setting is individualized for the user in context of the type of items with an algorithmic noise function utilized to obfuscate a proportional level of the information associated with the user and the type of items based on the received privacy level selection. Notably, a user can initiate to set the privacy level that he or she wants in the system, or the recommendation module can recommend a personalized privacy level for the user. The recommendation module can also generate recommendations of relevant items for the user based on the determined privacy setting as individualized for the user in context of the type of items.

In implementations, the algorithmic noise function utilized by the recommendation module to obfuscate the proportional level of the information associated with the user and the type of items is a Laplacian noise distribution added to the information so as to prevent identification of the user, while obfuscated information associated with a group of users still provides accurate results for recommendations based on privacy. Generally, the accuracy of recommendation results for the group of users may diminish or differ from the accuracy of the recommendation results for the individual user, given the user may have a lower personalized privacy level that allows for more accurate recommendation results, while the accuracy of the recommendation results for the group diminishes given the benefit of higher privacy. The privacy setting for the user can be determined relative to an amount of the Laplacian noise distribution utilized to obfuscate the information that is associated with the user. For example, a higher level of the privacy setting can be determined by the recommendation module, where the higher level of the privacy setting corresponds to a higher noise being sampled from a Laplacian distribution with a higher scale that increases the probability of values being picked to introduce more noise than in the case of a lower privacy setting. Alternatively, a lower level of the privacy setting can be determined by the recommendation module based on a lower noise being sampled from the Laplacian distribution of lower scale, as being utilized to obfuscate the information.

The recommendation module is implemented to determine and recommend the privacy setting for the user who is associated with the user profile as one of a user-based privacy (UBP) mode, an item-based privacy (IBP) mode, or a user-item based privacy (UIBP) mode. Additionally, the privacy modes are switchable by the recommendation module for the users, effective to switch between the privacy modes. The user-based privacy (UBP) mode correlates to the received privacy level selection as an indication from the user of privacy concern. The item-based privacy (IBP) mode correlates to obfuscation made based on the type of items. The user-item based privacy (UIBP) mode correlates to the received privacy level selection from the user, which is an indication from the user of privacy concern, and the privacy level can be selected differently for the different types of items.

In aspects of the recommendation system based on individualized privacy settings, the recommendation module can receive privacy level selections for different types of items corresponding to the user profile in the recommendation system. The recommendation module can then determine a different privacy setting for the user who is associated with the user profile, where the different privacy setting is individualized for the user in context of the different type of items with the algorithmic noise function utilized to obfuscate a proportional level of the information associated with the user and the different type of items based on the different privacy level selection. Notably, the recommendation module can determine different privacy settings for the user who is associated with the user profile based on the different privacy level selections received from the user and/or based on different types of the items.

In another aspect of the recommendation system based on individualized privacy settings, the recommendation module can receive an additional privacy level selection for the type of items corresponding to a different user profile in the recommendation system. The recommendation module can then determine a different privacy setting for another user associated with the different user profile, where the different privacy setting is individualized for the other user in context of the type of items with the algorithmic noise function utilized to obfuscate a different proportional level of the information associated with the other user and the type of items based on the additional privacy level selection. Notably, the recommendation module can determine different privacy settings for different users who are associated with different user profiles in the recommendation system.

BRIEF DESCRIPTION OF THE DRAWINGS

Implementations of a recommendation system based on individualized privacy settings are described with reference to the following Figures. The same numbers may be used throughout to reference similar features and components that are shown in the Figures.

DETAILED DESCRIPTION

Implementations of a recommendation system based on individualized privacy settings are described, and provide that users can set different privacy levels for information and user data corresponding to different items, which improves the overall user experience when interacting with a recommendation system. Notably, a user is provided with privacy level input control, and the user can designate which data to keep private for a subset of items, rather than having a default of all the information and user data that is associated with a user profile of the user being designated with only one level of privacy. Typically, users of a mobile application may not know, or are unaware of, how to ensure privacy of their data. The recommendation system provides to determine privacy settings for the users based on privacy level selections, and maintains user data privacy while also being able to provide recommendations that are relevant to the respective users.

In an example scenario, a user of a computing device may access any number of websites via a browser application user interface, and a website may implement a recommendation system to assist a user with an input request for relevant items to the user. As the user views and/or interacts with items displayed in the browser interface, the user can also provide user feedback with reference to any type of items or services associated with a website. Generally, the user feedback can either be explicit in the form of ratings and reviews and/or the user feedback can be implicit, which may be inferred from various indications, such as whether the user selected to view an item or not, an amount of time spent browsing a particular item, and the like. The recommendation system of a website receives the user feedback as input and can generate a list of relevant items to the user, which can be displayed in the browser application. As noted above, the user feedback provided by a user can potentially indicate extra information about the user that he or she may not want to have disclosed.

In aspects of the described recommendation system, the dataset that is collected by the website as the user feedback can be maintained as private user data, while determining relevant recommendations for the user that don't reveal extra information about the user. Accordingly, the recommendation system described herein maintains and adjusts to the privacy preferences of a user, and does so while limiting or preventing the loss in accuracy of a collaborative filtering recommendation system. In implementations, the recommendation system can prescribe the privacy settings that protect the privacy of user data while the user interacts with websites and provides user feedback. Additionally, the recommendation system accommodates different privacy levels of privacy for different users and based on types of items that are relevant to a user. A privacy algorithm of the recommendation system reduces the amount of noise introduced into the system to obfuscate the user data, significantly improving the recommendation performance over the conventional techniques that can only accommodate a single level of privacy. As noted above, conventional differential privacy techniques introduce a large amount of noise, which degrades the performance of the recommendation system for all users, particularly for those who may only want a low level of privacy.

In aspects of the described recommendation system, a server computing device implemented in a cloud-based recommendation service system can maintain user profiles of information and recommendations associated with users of the recommendation system. The computing device includes a recommendation module that is implemented to receive a privacy level selection from a user and for a type of items corresponding to a user profile in the system. For example, the type of items associated with a user of the user profile may be movies, videos, or other multimedia, as well as any type of products and/or services. The recommendation module can determine a privacy setting for the user associated with the user profile, where the privacy setting is individualized for the user in context of the type of items with an algorithmic noise function utilized to obfuscate a proportional level of the information associated with the user and the type of items based on the received privacy level selection. The recommendation module can also generate recommendations of relevant items for the user based on the determined privacy setting as individualized for the user in context of the type of items.

In implementations, the algorithmic noise function utilized by the recommendation module to obfuscate the proportional level of the information associated with the user and the type of items is a Laplacian noise distribution added to the information so as to prevent identification of the user, while obfuscated information associated with a group of users still provides accurate results for recommendations based on privacy. The privacy setting for the user can be determined relative to an amount of the Laplacian noise distribution utilized to obfuscate the information that is associated with the user. For example, a higher level of the privacy setting can be determined by the recommendation module, where the higher level of the privacy setting corresponds to a higher noise being sampled from a Laplacian distribution with a higher scale that increases the probability of values being picked to introduce more noise than in the case of a lower privacy setting. Alternatively, a lower level of the privacy setting can be determined by the recommendation module based on a lower noise being sampled from the Laplacian distribution of lower scale, as being utilized to obfuscate the information. Generally, a differential privacy technique can be implemented by a privacy algorithm of the recommendation system, and a Laplacian or Gaussian noise distribution is added to obfuscate the information that is associated with the user.

The recommendation module is implemented to determine and recommend the privacy setting for the user who is associated with the user profile as one of a user-based privacy (UBP) mode, an item-based privacy (IBP) mode, or a user-item based privacy (UIBP) mode. The recommendation module can determine the privacy setting for the user depending on the user's level of privacy concern. Additionally, the privacy modes are switchable by the recommendation module for the users of the recommendation system, effective to switch between the privacy modes as dictated by the organization or enterprise owning the recommendation system. The user-based privacy (UBP) mode correlates to the received privacy level selection as an indication from the user of privacy concern. The item-based privacy (IBP) mode correlates to obfuscation made based on the type of items. The user-item based privacy (UIBP) mode correlates to the received privacy level selection from the user, which as an indication from the user of privacy concern, and the privacy level can be selected differently for the different types of items.

While features and concepts of a recommendation system based on individualized privacy settings can be implemented in any number of different devices, systems, networks, environments, and/or configurations, implementations of the recommendation system based on individualized privacy settings are described in the context of the following example devices, systems, and methods.

Figure 1:
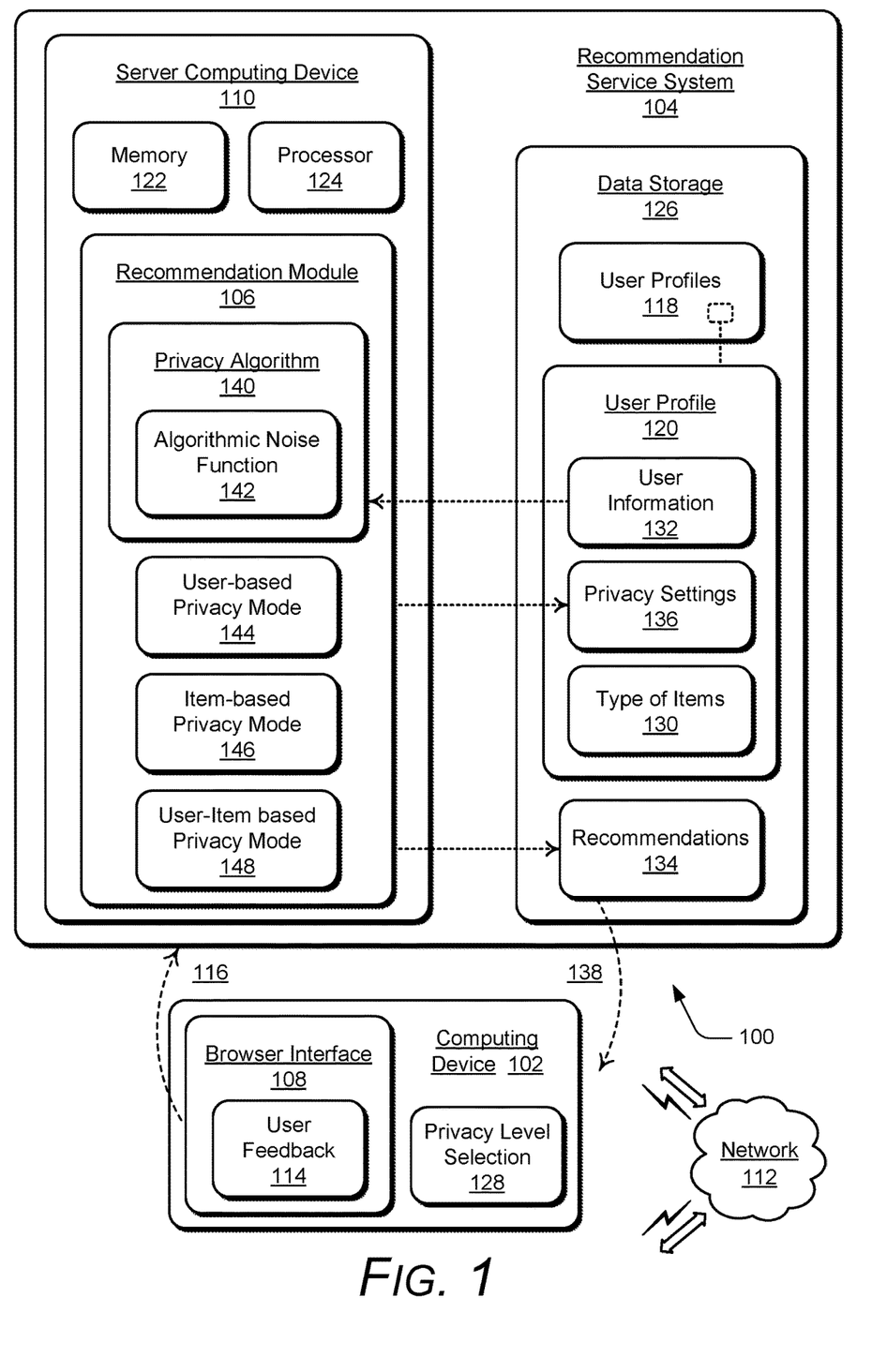
FIG. 1 illustrates an example environment in which aspects of a recommendation system based on individualized privacy settings can be implemented.

FIG. 1 illustrates an example environment 100 in which aspects of a recommendation system based on individualized privacy settings can be implemented. The example environment 100 includes a computing device 102 and a recommendation service system 104, which implements features of a recommendation module 106 in the described recommendation system. The computing device 102 can be implemented as any type of computing device, client device, mobile phone, tablet device, communication, entertainment, gaming, media playback, and/or other type of user device via which a user can interact with a browser application user interface 108. In this example environment 100, the computing device 102 may include any number and combination of different components as further described with reference to the example device shown in FIG. 4, and is implemented to access and communicate with a server computing device 110 of the recommendation service system 104, such as via a communication network 112.

A user of the computing device 102 may access any number of websites via the browser application user interface 108 and provide user feedback 114 with reference to any type of items or services associated with the websites. As noted above, the user feedback 114 provided by a user of the computing device 102 can potentially indicate extra information about the user that he or she may not want to disclose. For example, the user feedback 114 can either be explicit in the form of ratings and reviews and/or the user feedback can be implicit, which may be inferred from various indications, such as whether the user selected to view an item or not, an amount of time spent browsing a particular item, and the like. The recommendation service system 104 can receive the user feedback 114 from the computing device 102 as indicated at 116 via the network 112.

Any of the devices, servers, and/or services described herein can communicate via the network 112, such as for data communication between the computing device 102 and the recommendation service system 104. The network 112 can be implemented to include a wired and/or a wireless network. The network can also be implemented using any type of network topology and/or communication protocol, and can be represented or otherwise implemented as a combination of two or more networks, to include IP-based networks and/or the Internet. The network 112 may also include mobile operator networks that are managed by a mobile network operator and/or other network operators, such as a communication service provider, mobile phone provider, and/or Internet service provider.

In this example environment 100, the recommendation service system 104 is representative of any number of cloud-based access sites that provide a service and/or from which data and information is available, such as via the Internet, for on-line and/or network-based access. The recommendation service system 104 is a recommendation service that can be accessed on-line, and includes a database of user profiles 118, such as an individualized user profile 120 corresponding to the user of the computing device 102. The recommendation service system 104 includes the server computing device 110, which is representative of one or more hardware server devices (e.g., computing devices) that may be implemented at the recommendation service system. The server computing device 110 includes memory 122 and a processor 124, and may include any number and combination of different components as further described with reference to the example device shown in FIG. 4.

In this example environment 100, the server computing device 110 implements the recommendation module 106, such as in software, in hardware, or as a combination of software and hardware components. In this example, the recommendation module 106 is implemented as a software application or modules, such as executable software instructions (e.g., computer-executable instructions) that are executable with a processing system (e.g., the processor 124) of the server computing device 110 to implement the techniques of the recommendation system based on individualized privacy settings. The recommendation module 106 can be stored on computer-readable storage media, such as any suitable memory device (e.g., the device memory 122) or electronic data storage implemented in the server computing device 110 and/or at the recommendation service system 104. The recommendation service system 104 may include multiple data storage, server devices, and applications, and can be implemented with various components as further described with reference to the example device shown in FIG. 4. The recommendation service system 104 also includes data storage 126 that may be implemented as any suitable memory, memory device, or electronic data storage for network-based data storage. The data storage 126 is utilized at the recommendation service system 104 to maintain the user profiles 118.

In aspects of the described recommendation service system 104, the recommendation module 106 can receive a privacy level selection 128 from a user of the computing device 102 for a type of items 130 corresponding to the user profile 120 in the system. For example, the type of items associated with the user of the user profile 120 may be movies, videos, or other multimedia, as well as any type of products and/or services. The user feedback 114 that is provided by the user with reference to any type of items or services associated with websites via the browser interface 108 at the computing device 102 is also maintained as user information 132 that corresponds to the user profile 120 for the user of the computing device 102. The recommendation module 106 can also generate recommendations 134 of relevant items for the user based on a determined privacy setting 136 as individualized for the user in context of the type of items 130. The recommendation module 106 can implement a matrix factorization based recommendation algorithm that is flexible enough to accommodate different levels of privacy for different users and items. The computing device 102 can then receive the recommendations 134 from the recommendation service system 104 as indicated at 138 via the network 112.

The recommendation module 106 includes a privacy algorithm 140 that is implemented to determine the privacy setting 136 for the user associated with the user profile. The privacy setting 136 is individualized for the user in context of the type of items 130 with an algorithmic noise function 142 that is utilized to obfuscate a proportional level of the user information 132 associated with the user and the type of items based on the received privacy level selection 128. Generally, a differential privacy technique can be implemented by the privacy algorithm 140 of the recommendation module 106, and a Laplacian or Gaussian noise distribution is added as the algorithmic noise function 142 to obfuscate the user information 132 that is associated with the user of the user profile 120.

Differential privacy protects each record in a dataset (e.g., the user information 132 for respective corresponding user profiles 118) by ensuring that the output remains almost the same if the record is present, and the output on a group of records remains the same even if the record is absent. For example, a dataset X contains a record r and another dataset X' does not contain r. If M is a differentially private algorithm whose range is R and M(X) denotes the output of algorithm M on X, then for any S⊆R, the probability of the output on X belonging to S is bounded within a certain limit of the probability of the output on X' belonging to the same range as in the following Equation (1):

$$P(M(X) \in S) \leq e^\epsilon P(M(X') \in S)$$

Given that X and X' can be interchanged, the following Equation (2):

$$\frac{1}{e^\epsilon} P(M(X') \in S) \leq P(M(X) \in S) \leq e^\epsilon P(M(X') \in S)$$

implies that the presence or absence of the record r has little or no impact (e.g., limited impact) on the output of algorithm M based on the parameter ε. Thus, M is said to be ε-differentially private. Adding Laplacian noise to the output of a deterministic function $f$ makes it ε-differentially private if the noise has scale $$\frac{\Delta f}{\epsilon}$$

and u mean, i.e., would be an ε-DP algorithm as given by the following Equation (3):

$$M(X) = f(X) + Lap\left(0, \frac{\Delta f}{\epsilon}\right)$$

where, $\Delta f = \max\|f(X) - f(X')\|_1$ and X, X' are any two neighboring datasets which differ only in one record. The noise is characterized by the parameter ε, where the value of ε determines the amount of noise added and hence, the level of obfuscation. The lower the value of ε, the higher the amount of noise added and thus, a higher privacy of the records is ensured by the system. Thus, differential privacy allows one to specify the amount of privacy in terms of the continuous variable e.

In implementations of the described recommendation system, the algorithmic noise function 142 utilized by the privacy algorithm 140 of the recommendation module 106 to obfuscate the proportional level of the user information 132 associated with the user and the type of items 130 is a Laplacian noise distribution added to the user information 132 so as to prevent identification of the user, while obfuscated information associated with a group of users corresponding to the user profiles 118 still provides accurate results for recommendations based on privacy. The privacy setting 136 for the user can be determined by the privacy algorithm 140 relative to an amount of the Laplacian noise distribution utilized to obfuscate the user information 132 that is associated with the user. For example, a higher level of the privacy setting 136 can be determined by the privacy algorithm 140 of the recommendation module 106, where the higher level of the privacy setting corresponds to a higher noise being sampled from a Laplacian distribution with a higher scale that increases the probability of values being picked to introduce more noise than in the case of a lower privacy setting. Alternatively, a lower level of the privacy setting 136 can be determined by the privacy algorithm 140 of the recommendation module 106 based on a lower noise being sampled from the Laplacian distribution of lower scale, as being utilized to obfuscate the information.

The privacy algorithm 140 of the recommendation module 106 is implemented to determine the privacy setting 136 for the user who is associated with the user profile 120 as one of a user-based privacy (UBP) mode 144, an item-based privacy (IBP) mode 146, or a user-item based privacy (UIBP) mode 148. The privacy algorithm 140 of the recommendation module 106 can determine the privacy setting 136 for the user depending on the user's level of privacy concern. Additionally, the privacy modes are switchable by the recommendation module 106 for the users of the recommendation system, effective to switch between the privacy modes, providing varying amounts of flexibility to the user to set the privacy level. The user-based privacy (UBP)

mode correlates to the received privacy level selection as an indication from the user of privacy concern. The item-based privacy (IBP) mode correlates to obfuscation made based on the type of items, such as the certification rating of a movie. The user-item based privacy (UIBP) mode correlates to the received privacy level selection from the user, which is an indication from the user of privacy concern, and the privacy level can be selected differently for the different types of items.

In implementations of the described recommendation system, the recommendation module 106 can initially prescribe privacy levels for the users to ease the difficulty in selecting a privacy level in the beginning, and the initially selected privacy level can be adjusted as a user interacts more with the system and observes the quality of recommendations 134 that are received over time. Notably, the item-based privacy (IBP) mode can be used or prescribed initially to address the cold start problem when there is no data available for the privacy levels preferred by a user. For example, a new user seeking movie recommendations (as the type of items 130) can be prescribed the item-based privacy (IBP) mode, where the privacy level is set at the item level using intrinsic information related to movies. To prescribe privacy levels for the movies in a rule based fashion, the recommendation module 106 can utilize information specific to the movies, for instance, the MPAA movie rating with movies for general audiences being prescribed a lower privacy setting and movies for mature audiences being prescribed a higher privacy setting.

The recommendation system can provide suggestions to users for which privacy level to be used for different items and the users have the option to then modify the suggested privacy levels. As a new user becomes conversant with the recommendation system, the user can modify the privacy levels for different types of items. The recommendation module 106 can then use the input from the user to recommend privacy levels for different user-item pairs in the user-item based privacy (UIBP) mode. This can be implemented using a standard collaborative filtering algorithm on an incomplete user-item matrix consisting of privacy levels, L, used by users for different items.

Generally, a dataset D includes the user feedback 114 (explicit or implicit) from a user of the computing device 102 for different items. The variable U denotes the set of users in the dataset D and I represents the items (as the type of items 130). Then D(u, i) represents the numerical value of the feedback for user u and item i. The numerical value can either be a discrete value in case of explicit feedback or a continuous value for implicit feedback scenarios. Note that D(u, i) exists only if a user u has interacted with an item i. Without loss of generality, these values can be converted to lie in a common interval, say [0, 1] using standard normalization techniques. Thus, as described herein, D(u, i)∈[0, 1] for any u∈U and i∈I. As noted above, from a user experience point of view, it can generally be difficult to specify a particular value of the noise function to specify the level of privacy a user may need or want. In implementations, users are then provided the option of choosing levels of privacy in terms of user-friendlier terms denoted by a set L={low, medium, high} and the recommendation system is designed to translate these levels into corresponding ε values denoted by E={$\varepsilon_{low}$, $\varepsilon_{medium}$, $\varepsilon_{high}$}. Notably, the set L of privacy levels is an example, where the recommendation system can be implemented to support any number of discrete terms, which have corresponding epsilon values set in the system.

As noted above, the user-based privacy (UBP) mode correlates to the received privacy level selection as an indication from the user of privacy concern. In the UBP mode, each user u∈U can specify his or her own privacy level to avoid choosing the highest privacy level for all users. The set of privacy levels can be denoted $P_{ubp}$ where $P_{ubp}(u)$∈represents the privacy level specified by the user. Additionally, the item-based privacy (IBP) mode correlates to obfuscation made based on the type of items. In the IBP mode, the idea of UBP is extended to specify levels based on the intrinsic properties of a type of item. For example, users may be concerned about revealing the medicines they purchase from Amazon. Similar to UBP, the set of privacy levels can be denoted $P_{ibp}$ where $P_{ibp}(i)$∈L represents the privacy level for each item I∈I. Additionally, the user-item based privacy (UIBP) mode correlates to the received privacy level selection from the user, which is an indication from the user of privacy concern, and the privacy level can be selected differently for the different types of items. The UIBP mode is a hybrid of the UBP mode and the IBP mode described above, and the UIBP mode provides the most flexibility for a user u to specify a privacy level $P_{uibp}(u, i)$∈L for an item i.

In the aspects of the recommendation system based on individualized privacy settings, generating the recommendations 134 by the recommendation module 106 based on different levels of differential privacy involves two stages, a perturbation of ratings and then the recommendation module 106 generating the recommendations. Initially, the feedback dataset D is perturbed before deploying the matrix factorization approach, which is a mechanism of ensuring differential privacy and is known as input perturbation. Using Laplacian noise for perturbation, the Laplacian distribution centered at 0 is given by the following Equation (4):

$$Lap(x, b) = \frac{1}{2b} \exp\frac{-|x|}{b},$$

where the variable b represents the scale of the distribution and for ensuring ε-differential privacy $$b = \frac{\Delta f}{\varepsilon}.$$

Here $\Delta f$ is the range of the data, $\Delta f$=max D−min D, which in this example is one (1).

For perturbing the ratings, a random sample is drawn from this Laplace distribution, with the specified scale, and added to the rating. If the value exceeds the interval boundary (less than 0 or more than 1), then it is clamped to the nearest boundary value, and the variable D' denotes the set of perturbed ratings. For each of the three described privacy modes, the user-based privacy (UBP) mode 144, the item-based privacy (IBP) mode 146, and the user-item based privacy (UIBP) mode 148, the set of perturbed ratings can be defined for each as in the following equations and description.

In the user-based privacy (UBP) mode 144, the set of privacy levels given by users $P_{ubp}$ can be used to obtain the corresponding set $E_{ubp}$ where $E_{ubp}(u)$∈E. Then, the set of perturbed ratings can be defined by the following Equation (4):

$$D'_{ubp}(u, i) = \begin{cases} D(u, i) + Lap\left(x, \frac{\Delta f}{E_{ubp}(u)}\right), & 0 \leq D(u, i) + Lap\left(x, \frac{\Delta f}{E_{ubp}(u)}\right) \leq 1 \\ 0, & D(u, i) + Lap\left(x, \frac{\Delta f}{E_{ubp}(u)}\right) < 0 \\ 1, & D(u, i) + Lap\left(x, \frac{\Delta f}{E_{ubp}(u)}\right) > 1 \end{cases}$$

In the item-based privacy (IBP) mode 146, the set of privacy levels given for items $P_{ibp}$ can be used to obtain the corresponding set $E_{ibp}$ where $E_{ibp}(i) \in E$. Then, the set of perturbed ratings can be defined by the following Equation (5):

$$D'_{ibp}(u, i) = \begin{cases} D(u, i) + Lap\left(x, \frac{\Delta f}{E_{ibp}(i)}\right), & 0 \leq D(u, i) + Lap\left(x, \frac{\Delta f}{E_{ibp}(i)}\right) \leq 1 \\ 0, & D(u, i) + Lap\left(x, \frac{\Delta f}{E_{ibp}(i)}\right) < 0 \\ 1, & D(u, i) + Lap\left(x, \frac{\Delta f}{E_{ibp}(i)}\right) > 1 \end{cases}$$

In the user-item based privacy (UIBP) mode 148, the set of privacy levels given for user-item pairs $P_{uibp}$ can be used to obtain the corresponding set $E_{uibp}$ where $E_{uibp}(u, i) \in E$. Then, the set of perturbed ratings can be defined by the following Equation (6):

$$D'_{uibp}(u, i) = \begin{cases} D(u, i) + Lap\left(x, \frac{\Delta f}{E_{uibp}(u, i)}\right), & 0 \leq D(u, i) + Lap\left(x, \frac{\Delta f}{E_{uibp}(u, i)}\right) \leq 1 \\ 0, & D(u, i) + Lap\left(x, \frac{\Delta f}{E_{uibp}(u, i)}\right) < 0 \\ 1, & D(u, i) + Lap\left(x, \frac{\Delta f}{E_{uibp}(u, i)}\right) > 1 \end{cases}$$

Once the ratings have been perturbed, D' can be used by the recommendation system (or any recommender system) that operates on the type of dataset. In implementations, a matrix factorization approach can be utilized, and the recommendation algorithm of the recommendation module 106 facilitates to estimate missing entries in the user-item matrix. For example, the algorithm can learn two latent factor matrices: $P \in [0,1]^{U \times k}$ (user factors) and $Q \in [0,1]^{I \times k}$ (item factors). Here, k denotes the number of latent factors. Along with these, user bias, $b_u$, and item bias, $b_i$ are also learned that increases the robustness to bias. Further, an overall average (global bias) μ term in the following Equation (7) is used to compute the average of ratings in the matrix. These factors and bias terms are learned using the alternating least squares optimization technique which optimizes the objective function given by the following Equation (7), where λ acts as the regularization parameter to prevent overfitting of the model:

$$\min_{P, Q, b_u, b_i} = \sum_{D'(u, i)} (D'(u, i) - \mu - b_u - b_i - P(u) \cdot Q^T(i))^2 + \lambda(\|P(u)\|_2 + \|Q(i)\|_2 + b_u^2 + b_i^2)$$

Example methods 200 and 300 are described with reference to respective FIGS. 2 and 3 in accordance with one or more aspects of a recommendation system based on individualized privacy settings. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 2:
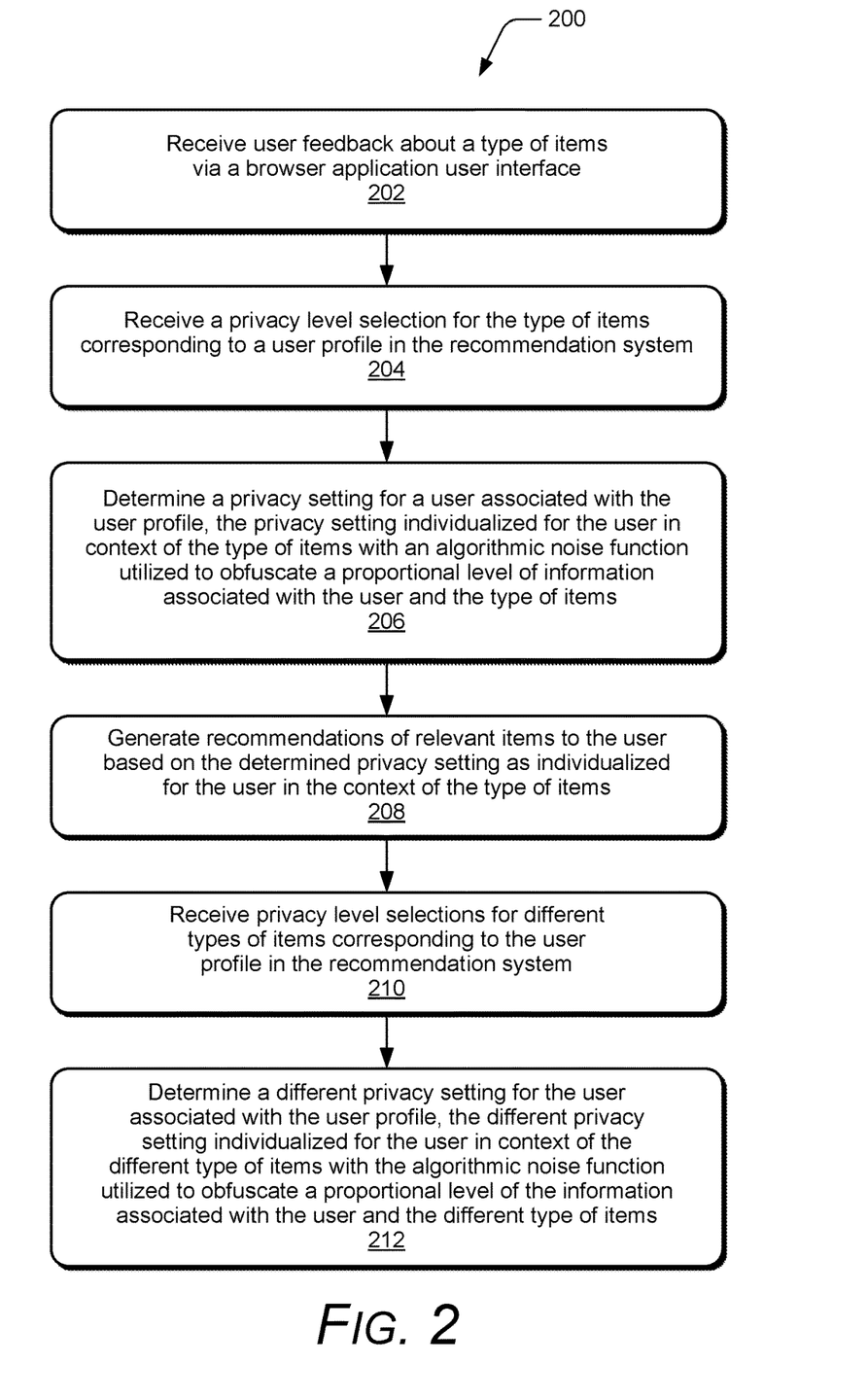
FIG. 2 illustrates an example method of a recommendation system based on individualized privacy settings in accordance with one or more implementations.

FIG. 2 illustrates example method(s) 200 for a recommendation system based on individualized privacy settings, and is generally described with reference to the recommendation service system as shown and described with reference to FIG. 1. The order in which the method is described is not intended to be construed as a limitation, and any number or combination of the method operations can be combined in any order to implement a method, or an alternate method.

At 202, user feedback is received about a type of items via a browser application user interface. For example, the recommendation module 106 of the recommendation service system 104 receives the user feedback 114 about a type of items 130 via the browser application user interface 108 as explicit feedback and/or implicit feedback about the type of items. At 204, a privacy level selection is received for the type of items corresponding to a user profile in the recommendation system. For example, the recommendation module 106 also receives the privacy level selection 128 for the type of items 130 corresponding to the user profile 120 in the recommendation system.

At 206, a privacy setting is determined for a user associated with the user profile, the privacy setting individualized for the user in context of the type of items with an algorithmic noise function utilized to obfuscate a proportional level of information associated with the user and the type of items. For example, the privacy algorithm 140 of the recommendation module 106 determines the privacy setting 136 for the user associated with the user profile 120. The privacy setting 136 is individualized for the user in context of the type of items 130 with the algorithmic noise function 142 utilized to obfuscate a proportional level of the user information 132 associated with the user and the type of items 130 based on the received privacy level selection 128. The determined privacy setting 136 for the user can be applied by the recommendation module 106 to the user feedback 114.

In implementations, the privacy setting 136 for the user is determined as one of the user-based privacy (UBP) mode 144, the item-based privacy (IBP) mode 146, or a as the user-item based privacy (UIBP) mode 148, and the privacy modes are switchable by the recommendation module 106 for the users of the recommendation system effective to switch between the privacy modes. For example, the privacy setting 136 for the user can be determined by the privacy algorithm 140 of the recommendation module 106 as the user-based privacy (UBP) mode 144 that correlates to the received privacy level selection 128 as an indication from the user of privacy concern. Alternatively, the privacy setting 136 for the user can be determined by the privacy algorithm 140 of the recommendation module 106 as the item-based privacy (IBP) mode 146 that correlates to obfuscation made based on the type of items, and using intrinsic information related to the items. Alternatively, the privacy setting 136 for the user can be determined by the privacy algorithm 140 of the recommendation module 106 as the user-item based privacy (UIBP) mode 148 that correlates to the received privacy level selection 128 from the user, which is an indication from the user of privacy concern, and correlates to the privacy level being selected differently for the different types of items.

Further, the algorithmic noise function 142 utilized to obfuscate the proportional level of the user information 132 associated with the user and the type of items 130 can be implemented as a Laplacian noise distribution added to the information so as to prevent identification of the user. The privacy setting 136 for the user is determined relative to an amount of the Laplacian noise distribution utilized to obfuscate the information that is associated with the user. Notably, a higher level of the privacy setting 136 is determined, where the higher level of the privacy setting corresponds to a higher noise being sampled from a Laplacian distribution with a higher scale that increases the probability of values being picked to introduce more noise than in the case of a lower privacy setting. The lower level of the privacy setting 136 is determined based on a lower noise being sampled from the Laplacian distribution of lower scale, as being utilized to obfuscate the information.

At 208, recommendations of relevant items to the user are generated based on the determined privacy setting as individualized for the user in the context of the type of items. For example, the recommendation module 106 generates the recommendations 134 of relevant items to the user based on the determined privacy setting 136 as individualized for the user in the context of the type of items 130. At 210, privacy level selections are received for different types of items corresponding to the user profile in the recommendation system. For example, the recommendation module 106 receives privacy level selections for the different types of items corresponding to the user profile 120 in the recommendation system.

At 212, a different privacy setting is determined for the user associated with the user profile, the different privacy setting individualized for the user in context of the different type of items with the algorithmic noise function utilized to obfuscate a proportional level of the information associated with the user and the different type of items. For example, the privacy algorithm 140 of the recommendation module 106 determines a different privacy setting 136 for the user associated with the user profile. The different privacy setting 136 is also individualized for the user in context of the different type of items with the algorithmic noise function 142 utilized to obfuscate a proportional level of the user information 132 associated with the user and the different type of items based on the different privacy level selection.

Figure 3:
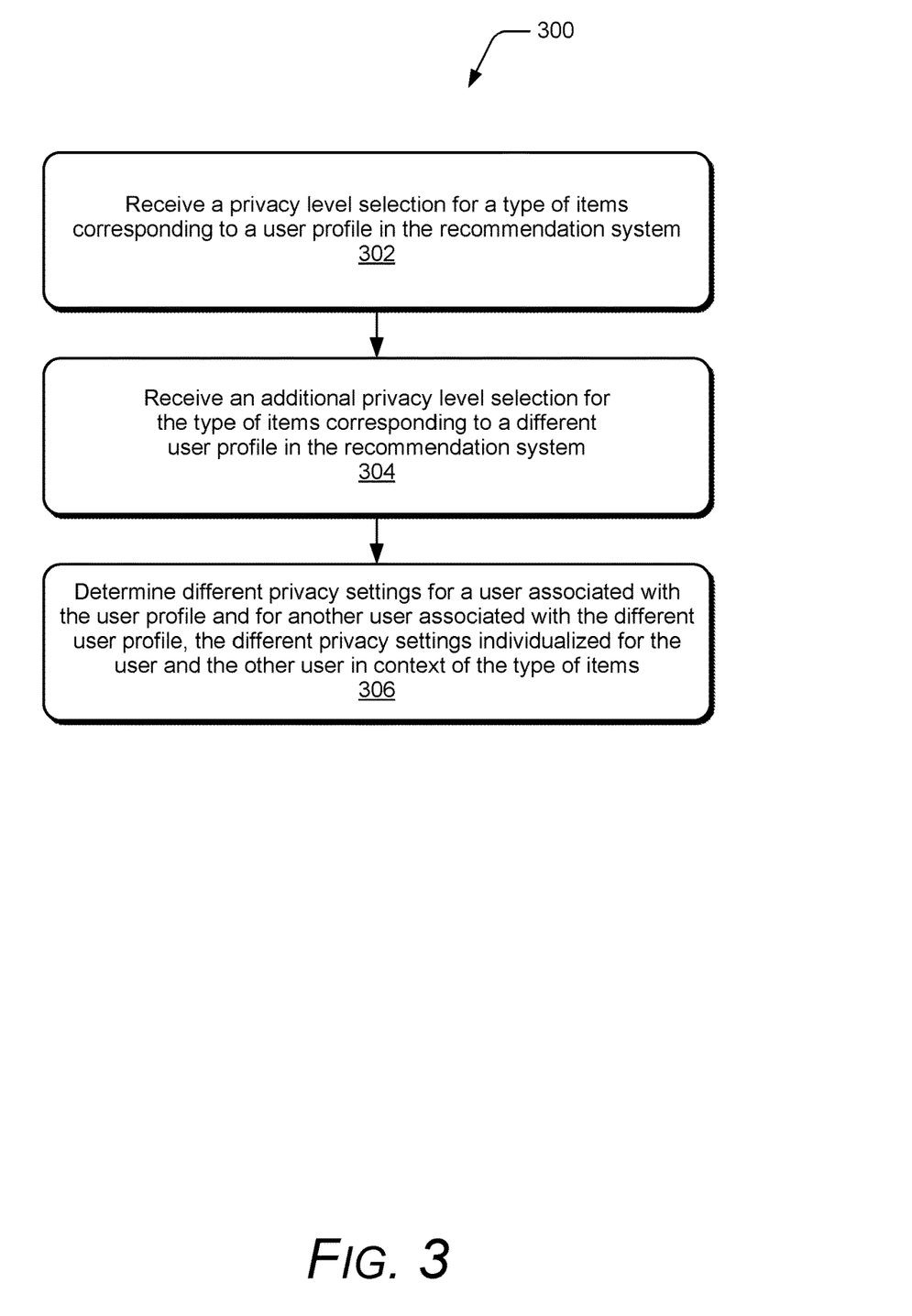
FIG. 3 illustrates an example method of a recommendation system based on individualized privacy settings in accordance with one or more implementations.

FIG. 3 illustrates example method(s) 300 for a recommendation system based on individualized privacy settings, and is generally described with reference to the recommendation service system 104 as shown and described with reference to FIG. 1. The order in which the method is described is not intended to be construed as a limitation, and any number or combination of the method operations can be combined in any order to implement a method, or an alternate method.

At 302, a privacy level selection is received for a type of items corresponding to a user profile in the recommendation system. For example, the recommendation module 106 of the recommendation service system 104 receives the privacy level selection 128 for the type of items 130 corresponding to the user profile 120 in the recommendation system. At 304, an additional privacy level selection is received for the type of items corresponding to a different user profile in the recommendation system. For example, the recommendation module 106 also receives an additional privacy level selection for the type of items corresponding to a different user profile 118 in the recommendation system.

At 306, different privacy settings are determined for a user associated with the user profile and for another user associated with the different user profile, the different privacy settings individualized for the user and the other user in context of the type of items. For example, the privacy algorithm 140 of the recommendation module 106 determines different privacy settings 136 for a user associated with the user profile 120 and for another user associated with the different user profile 118. The different privacy settings 136 are individualized for the user and the other user in context of the type of items 130 with the algorithmic noise function 142 utilized to obfuscate a proportional level of the user information 132 associated with the user based on the received privacy level selection 128, and a different proportional level of the user information associated with the other user based on the received additional privacy level selection.

In implementations, the algorithmic noise function 142 that is utilized to obfuscate the proportional level of the user information 132 associated with the user and the different proportional level of the information associated with the other user is a Laplacian noise distribution added to the information so as to prevent identification of the users. Additionally, the different privacy settings 136 for the user and the other user are determined relative to an amount of the Laplacian noise distribution utilized to obfuscate the information that is associated with the respective users. Notably, a higher level of a privacy setting 136 is determined, where the higher level of the privacy setting corresponds to a higher noise being sampled from a Laplacian distribution with a higher scale that increases the probability of values being picked to introduce more noise than in the case of a lower privacy setting. The lower level of the privacy setting 136 is determined based on a lower noise being sampled from the Laplacian distribution of lower scale, as being utilized to obfuscate the information.

Figure 4:
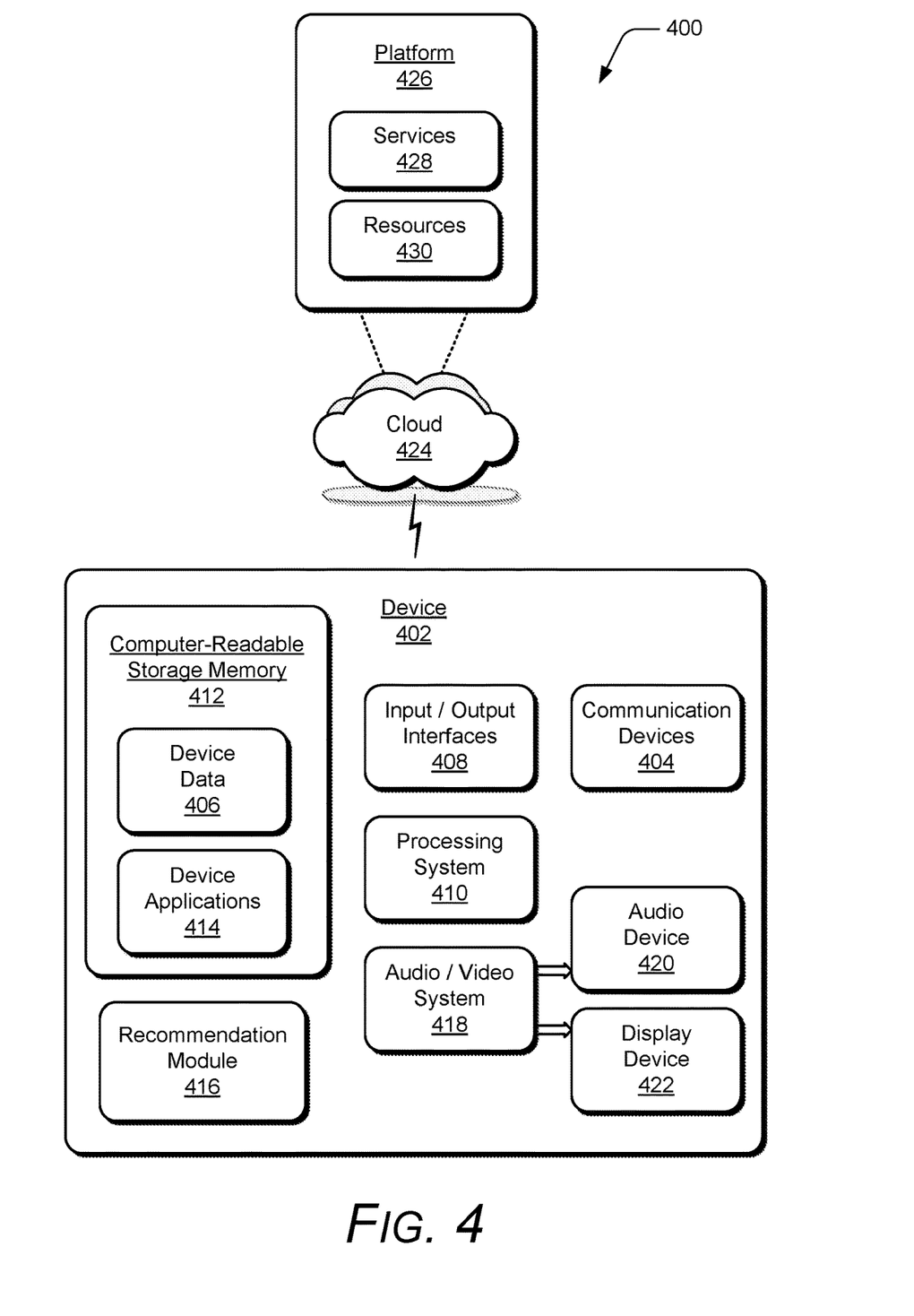
FIG. 4 illustrates an example system with an example device that can implement aspects of a recommendation system based on individualized privacy settings.

FIG. 4 illustrates an example system 400 that includes an example device 402, which can implement techniques of a recommendation system based on individualized privacy settings. The example device 402 can be implemented as any of the computing devices, mobile devices, server devices, and/or services described with reference to the previous FIGS. 1-3, such as any type of computing device, client device, mobile phone, tablet, communication, entertainment, gaming, media playback, and/or other type of device. For example, the computing device 102, the server computing device 110, and/or various server devices of the recommendation service system 104 may be implemented as the example device 402.

The example device 402 includes communication devices 404 that enable wired and/or wireless communication of device data 406, such as the user information, user feedback, and generated recommendations that is communicated between the devices in a network, as well as computer applications data and content that is transferred from one computing device to another, and/or synched between multiple computing devices. The device data 406 can include any type of audio, video, image, and/or graphic data that is generated by applications executing on the device. The communication devices 404 can also include transceivers for cellular phone communication and/or for network data communication.

The device 402 also includes input/output (I/O) interfaces 408, such as data network interfaces that provide connection and/or communication links between the device, data networks, and other devices. The I/O interfaces can be used to couple the device to any type of components, peripherals, and/or accessory devices, such as a digital camera device and/or computer input device that may be integrated with the example device 402. The I/O interfaces also include data input ports via which any type of data, media content, and/or inputs can be received, such as user inputs to the device, as well as any type of audio, video, and/or image data received from any content and/or data source.

The device 402 includes a processing system 410 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 402 may further include any type of a system bus or other data and command transfer system that couples the various components within the device. A system bus can include any one or combination of different bus structures and architectures, as well as control and data lines.

The example device 402 also includes computer-readable storage memory 412, such as data storage devices implemented in hardware that can be accessed by a computing device, and that provide persistent storage of data and executable instructions (e.g., software applications, modules, programs, functions, and the like). The computer-readable storage memory described herein excludes propagating signals. Examples of computer-readable storage memory include volatile memory and non-volatile memory, fixed and removable media devices, and any suitable memory device or electronic data storage that maintains data for computing device access. The computer-readable storage memory 412 can include various implementations of random access memory (RAM), read-only memory (ROM), flash memory, and other types of storage memory in various memory device configurations.

The computer-readable storage memory 412 provides storage of the device data 406 and various device applications 414, such as an operating system that is maintained as a software application with the computer-readable storage memory and executed by the processing system 410. In this example, the device 402 includes a recommendation module 416 that implements the described techniques of a recommendation system based on individualized privacy settings, and may be implemented with hardware components and/or in software as one of the device applications 414, such as when the example device 402 is implemented as the server computing device 110 shown in FIG. 1. An example of the recommendation module 416 includes the recommendation module 106 that is implemented as a software application and/or as hardware components by the server computing device 110, and/or by other various server devices of the recommendation service system 104, as described with reference to FIGS. 1-3. In implementations, the recommendation module 416 may include independent processing, memory, and logic components as a computing and/or electronic device integrated with the device 402.

The device 402 also includes an audio and/or video system 418 that generates audio data for an audio device 420 and/or generates display data for a display device 422. The audio device and/or the display device include any devices that process, display, and/or otherwise render audio, video, display, and/or image data. In implementations, the audio device and/or the display device are integrated components of the example device 402. Alternatively, the audio device and/or the display device are external, peripheral components to the example device. In embodiments, at least part of the techniques described for a recommendation system based on individualized privacy settings may be implemented in a distributed system, such as over a "cloud" 424 in a platform 426. The cloud 424 includes and/or is representative of the platform 426 for services 428 and/or resources 430. For example, the services 428 may include the recommendation service system 104 described with reference to FIGS. 1-3.

The platform 426 abstracts underlying functionality of hardware, such as server devices (e.g., included in the services 428) and/or software resources (e.g., included as the resources 430), and connects the example device 402 with other devices, servers, etc. The resources 430 may also include applications and/or data that can be utilized while computer processing is executed on servers that are remote from the example device 402. Additionally, the services 428 and/or the resources 430 may facilitate subscriber network services, such as over the Internet, a cellular network, or Wi-Fi network. The platform 426 may also serve to abstract and scale resources to service a demand for the resources 430 that are implemented via the platform, such as in an interconnected device embodiment with functionality distributed throughout the system 400. For example, the functionality may be implemented in part at the example device 402 as well as via the platform 426 that abstracts the functionality of the cloud 424.

Although implementations of a recommendation system based on individualized privacy settings have been described in language specific to features and/or methods, the appended claims are not necessarily limited to the specific features or methods described. Rather, the specific features and methods are disclosed as example implementations of a recommendation system based on individualized privacy settings, and other equivalent features and methods are intended to be within the scope of the appended claims. Further, various different examples are described and it is to be appreciated that each described example can be implemented independently or in connection with one or more other described examples.

The invention claimed is:

1. In a digital memory environment for a recommendation system based on individualized privacy settings, a method implemented by at least one computing device, the method comprising:

receiving privacy level selections for different types of items corresponding to a user profile in the recommendation system;

determining different privacy settings for a user associated with the user profile, the different privacy settings individualized for the user in context of the different types of items with an algorithmic noise function utilized to obfuscate a proportional level of information associated with the user and the different types of items based on the received privacy level selections; and generating recommendations of relevant items to the user based on the determined different privacy settings as individualized for the user in the context of the different types of items.

2. The method as recited in claim 1, further comprising:
receiving user feedback of the different types of items via a browser application user interface as at least one of explicit feedback or implicit feedback about the different types of items; and applying the determined different privacy settings for the user to the user feedback of the different types of items.

3. The method as recited in claim 1, wherein the different privacy settings for the user are determined as a user-based privacy (UBP) mode that correlates to the received privacy level selections from the user as an indication of privacy concern.

4. The method as recited in claim 1, wherein the different privacy settings for the user are determined as an item-based privacy (IBP) mode that correlates to obfuscation made based on the different types of items.

5. The method as recited in claim 1, wherein the different privacy settings for the user are determined as a user-item based privacy (UIBP) mode that correlates to the received privacy level selections from the user and correlates to obfuscation made based on the different types of items.

6. The method as recited in claim 1, wherein the different privacy settings for the user are determined as one of a user-based privacy (UBP) mode, an item-based privacy (IBP) mode, or a user-item based privacy (UIBP) mode, and wherein the privacy modes are switchable by the recommendation module, effective to switch between the privacy modes.

7. The method as recited in claim 1, further comprising:
receiving an additional privacy level selection for the different types of items corresponding to a different user profile in the recommendation system; and determining a different privacy setting for another user associated with the different user profile, the different privacy setting individualized for the other user in context of the different types of items with the algorithmic noise function utilized to obfuscate a different proportional level of the information associated with the other user and the different types of items based on the additional privacy level selection.

8. The method as recited in claim 1, wherein the algorithmic noise function utilized to obfuscate the proportional level of the information associated with the user and the different types of items is a Laplacian noise distribution added to the information so as to prevent identification of the user.

9. The method as recited in claim 8, wherein the different privacy settings for the user are determined relative to an amount of noise being sampled from the Laplacian noise distribution utilized to obfuscate the information that is associated with the user; and wherein:

a higher level of at least one of the different privacy settings is determined based on a higher noise being sampled from the Laplacian noise distribution of higher scale utilized to obfuscate the information; or a lower level of at least one of the different privacy settings is determined based on a lower noise being sampled from the Laplacian noise distribution of lower scale utilized to obfuscate the information.

10. The method as recited in claim 1, wherein the different types of items are consumer products associated with the different privacy settings for the user profile.

11. A computing device implemented as a recommendation system based on individualized privacy settings, the computing device comprising:

a memory to maintain user profiles of information and recommendations associated with users of the recommendation system;

a processor system configured to execute a recommendation module implemented to:

receive privacy level selections for different types of items corresponding to a user profile in the recommendation system;

determine different privacy settings for a user associated with the user profile, the different privacy settings individualized for the user in context of the different types of items with an algorithmic noise function utilized to obfuscate a proportional level of the information associated with the user and the different types of items based on the received privacy level selections; and generate recommendations of relevant items for the user based on the determined different privacy settings as individualized for the user in the context of the different types of items.

12. The computing device as recited in claim 11, wherein the recommendation module is implemented to:

receive user feedback of the different types of items via a browser application user interface as at least one of explicit feedback or implicit feedback about the different types of items; and apply the determined different privacy settings for the user to the user feedback of the different types of items.

13. The computing device as recited in claim 11, wherein the recommendation module is implemented to determine the different privacy settings for the user as a user-based privacy (UBP) mode that correlates to the received privacy level selections as an indication from the user of privacy concern.

14. The computing device as recited in claim 11, wherein the recommendation module is implemented to determine the different privacy settings for the user as an item-based privacy (IBP) mode that correlates to obfuscation made based on the different types of items.

15. The computing device as recited in claim 11, wherein the recommendation module is implemented to determine the different privacy settings for the user as a user-item based privacy (UIBP) mode that correlates to the received privacy level selections from the user and correlates to obfuscation made based on the different types of items.

16. The computing device as recited in claim 11, wherein the recommendation module is implemented to determine the different privacy settings for the user as one of a user-based privacy (UBP) mode, an item-based privacy (IBP) mode, or a user-item based privacy (UIBP) mode, and wherein the privacy modes are switchable by the recommendation module, effective to switch between the privacy modes.

17. The computing device as recited in claim 11, wherein the different types of items are consumer products associated with the different privacy settings for the user profile.

18. In a digital memory environment for a recommendation system based on individualized privacy settings, a method implemented by at least one computing device, the method comprising:
- receiving a privacy level selection for different types of items corresponding to a user profile in the recommendation system;
- receiving an additional privacy level selection for the different types of items corresponding to a different user profile in the recommendation system; and
- determining different privacy settings for a user associated with the user profile and for another user associated with the different user profile, the different privacy settings individualized for the user and the other user in context of the different types of items with an algorithmic noise function utilized to obfuscate a proportional level of information associated with the user based on the received privacy level selection and a different proportional level of information associated with the other user based on the received additional privacy level selection.

19. The method as recited in claim 18, wherein the algorithmic noise function utilized to obfuscate the proportional level of the information associated with the user and the different proportional level of the information associated with the other user is a Laplacian noise distribution added to the information so as to prevent identification of the users.

20. The method as recited in claim 19, wherein the different privacy settings for the user and the other user are determined relative to an amount of noise being sampled from the Laplacian noise distribution utilized to obfuscate the information that is associated with the respective users; and wherein:
- a higher level of a privacy setting is determined based on a higher noise being sampled from the Laplacian noise distribution of higher scale utilized to obfuscate the information; or
- a lower level of the privacy setting is determined based on a lower noise being sampled from the Laplacian noise distribution of lower scale utilized to obfuscate the information.

* * * * *